United States Patent
Lim

(10) Patent No.: US 7,665,859 B2
(45) Date of Patent: Feb. 23, 2010

(54) BACKLIGHT ASSEMBLY HAVING FLUORESCENT AND LED LIGHT SOURCES, AND LIQUID CRYSTAL DISPLAY DEVICE INCLUDING THE SAME

(75) Inventor: Dae-San Lim, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 94 days.

(21) Appl. No.: 11/316,875

(22) Filed: Dec. 27, 2005

(65) Prior Publication Data
US 2007/0002554 A1    Jan. 4, 2007

(30) Foreign Application Priority Data
Jun. 30, 2005   (KR)   ............... 10-2005-0057481

(51) Int. Cl.
*G09F 13/04* (2006.01)
*G02F 1/1335* (2006.01)

(52) U.S. Cl. ............ 362/97.3; 362/240; 362/241; 362/238; 349/67; 349/68

(58) Field of Classification Search ......... 362/238, 362/240, 241, 97; 349/68, 70, 67
See application file for complete search history.

(56) References Cited

U.S. PATENT DOCUMENTS

| | | | | |
|---|---|---|---|---|
| 4,345,308 A | * | 8/1982 | Mouyard et al. | 362/245 |
| 4,914,731 A | * | 4/1990 | Chen | 340/815.45 |
| 4,935,665 A | * | 6/1990 | Murata | 362/240 |
| 4,992,704 A | * | 2/1991 | Stinson | 315/312 |
| 5,143,433 A | * | 9/1992 | Farrell | 362/29 |
| 5,226,723 A | * | 7/1993 | Chen | 362/241 |
| 5,479,275 A | * | 12/1995 | Abileah | 349/5 |
| 5,819,454 A | * | 10/1998 | Rosenitsch | 40/452 |
| 6,476,551 B1 | * | 11/2002 | Osawa et al. | 362/241 |
| 6,540,373 B2 | * | 4/2003 | Bailey | 362/241 |
| 6,857,767 B2 | * | 2/2005 | Matsui et al. | 362/373 |
| 2004/0037077 A1 | * | 2/2004 | Showers et al. | 362/249 |
| 2005/0073827 A1 | * | 4/2005 | Li | 362/240 |
| 2005/0099791 A1 | * | 5/2005 | Nagel | 362/31 |
| 2005/0174770 A1 | * | 8/2005 | Ratcliffe | 362/240 |
| 2006/0002143 A1 | * | 1/2006 | Gu et al. | 362/612 |
| 2006/0012989 A1 | * | 1/2006 | Lee | 362/231 |
| 2006/0087866 A1 | * | 4/2006 | Ng et al. | 362/612 |

(Continued)

OTHER PUBLICATIONS

"High-Luminance and High-Efficacy Electric-Field-Coupled Discharge Lamp for 18-in. Diagonal LCD Backlighting," K. Hashimoto et al., The University of Electro-Communications, Tokyo, Japan, SID 99 Digest pp. 760-763.

(Continued)

*Primary Examiner*—Ismael Negron
(74) *Attorney, Agent, or Firm*—McKenna Long & Aldridge

(57) ABSTRACT

A backlight assembly for a liquid crystal display device includes a plurality of first light sources at a first distance from an optical sheet, a plurality of second light sources at a second distance from the optical sheet, and a reflecting sheet disposed behind the first and second light sources, in which the first distance and the second distance are substantially different.

20 Claims, 5 Drawing Sheets

U.S. PATENT DOCUMENTS

2006/0104061 A1* 5/2006 Lerner et al. ............... 362/249
2006/0232964 A1* 10/2006 Hoshi et al. ................ 362/231
2007/0002565 A1* 1/2007 Han et al. .................. 362/240
2007/0058358 A1* 3/2007 Chikazawa et al. .......... 362/97
2007/0064171 A1* 3/2007 Moriyasu et al. ............ 349/61

OTHER PUBLICATIONS

"High-Luminance and High-Efficacy Electric-Field-Coupled Discharge Lamp for 18-in. Diagonal LCD Backlighting," K. Hashimoto et al., The University of Electro-Communications, Tokyo, Japan, SID 99 Digest pp. 760-763, 1999.

* cited by examiner

BACKLIGHT ASSEMBLY HAVING FLUORESCENT AND LED LIGHT SOURCES, AND LIQUID CRYSTAL DISPLAY DEVICE INCLUDING THE SAME

The present invention claims the benefit of Korean Patent Application No. 2005-0057481 filed on Jun. 30, 2005, which is hereby incorporated by reference for all purposes as if fully set forth herein.

BACKGROUND OF THE INVENTION

1. Field of the Invention

The present invention relates to a liquid crystal display device and more particularly, to a backlight assembly having fluorescent lamps and light emitting diodes as a light source and a liquid crystal display device including the same.

2. Discussion of the Related Art

Liquid crystal display (LCD) devices use the optical anisotropy and polarization properties of liquid crystal molecules to produce an image. Liquid crystal molecules have a definite alignment as a result of their long, thin shapes and are arranged to have initial pre-tilt angles. The alignment direction can be controlled by applying an electric field. Specifically, variations in an applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

In general, a liquid crystal display (LCD) device includes a liquid crystal panel and a backlight assembly. The liquid crystal panel includes two substrates, which are spaced apart and face each other, and a liquid crystal layer interposed between the two substrates. Each of the substrates includes an electrode, and the electrodes of each substrate also face each other. The backlight assembly is disposed at a rear side of the liquid crystal panel and provides the liquid crystal panel with a light. A voltage is applied to each electrode, and an electric field is induced between the electrodes. An arrangement of the liquid crystal molecules is changed by varying the intensity of the electric field.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images.

The backlight assembly may be classified into a side-type and a direct-type depending on a position of a light source. Generally, the backlight assembly includes a lamp as the light source. The lamp may be a cold cathode fluorescent lamp (CCFL) or an exterior electrode fluorescent lamp (EEFL). The side-type backlight assembly includes one lamp (or two lamps) at a side of the liquid crystal panel. The side-type backlight assembly further includes a light guide plate to provide light from the lamp to the liquid crystal panel by refracting the light. The direct-type backlight assembly includes a plurality of lamps directly under the liquid crystal panel to provide light to the liquid crystal panel.

Since the direct-type backlight assembly has relatively high brightness, the direct-type backlight assembly is widely used for large televisions or monitors.

FIG. 1 is a perspective view illustrating a liquid crystal display (LCD) device including a direct-type backlight assembly according to the related art. The LCD device includes a liquid crystal panel 10, a backlight assembly 20, and several combining elements.

In FIG. 1, the backlight assembly 20 is disposed at a rear side of the liquid crystal panel 10, and a main support 40, which is a rectangle frame, edges the backlight assembly 20 and the liquid crystal display panel 10. The main support 40 is combined with a bottom cover 50 thereunder to maintain a shape and to minimize a loss of light. To unite the above elements, a top cover 60 is connected to the main support 40 and the bottom cover 50.

Driving integrated circuits are connected to at least one side of the liquid crystal panel 10 through flexible printed circuit boards 12, and the flexible printed circuit boards 12 are bent toward a side of the main support 40 or a rear side of the bottom cover 50.

The backlight assembly 20 includes a reflecting sheet 22, a plurality of lamps 24, a couple of side supports 26, and optical sheets 28. The reflecting sheet 22 covers an inner surface of the bottom cover 50, and the plurality of lamps 24 are disposed on the reflecting sheet 22 side by side. The plurality of lamps 24 may be cold cathode fluorescent lamps. The side supports 26 are set on the bottom cover 50 across both ends of the plurality of lamps 24 to thereby fix the plurality of lamps 24. The optical sheets 28 are disposed over the plurality of lamps 24.

Accordingly, light, which is directly emitted from the plurality of lamps 24 or reflected on the reflecting sheet 22 after emitted from the plurality of lamps 24, is properly changed while passing through the optical sheets 28 and is provided to the liquid crystal panel 10.

Recently, light emitting diodes (LEDs) have been used as the light source. A backlight assembly including the LEDs may be referred to as an LED backlight assembly.

FIG. 2 is a perspective view illustrating an LCD device including an LED backlight assembly according to the related art. In the LCD device of FIG. 2, the same parts as the LCD device of FIG. 1 have the same references as the LCD device of FIG. 1, and explanation for the same parts will be omitted.

In the LED backlight assembly 30, a plurality of LEDs 33 are used as the light source. The plurality of LEDs 33 are set tip on each of a plurality of metal core printed circuit boards (MCPCBs) 32 in a line, wherein the plurality of MCPCBs 32 have a stripe shape and are arranged on the inner surface of the bottom cover 50. The plurality of LEDs 33 include one of red, green and blue LEDs, and on each MCPCB 32, the red, green and blue LEDs are sequentially arranged, whereby red, green and blue lights are mixed to produce a white light.

A reflecting sheet 34 covers the plurality of MCPCBs 32. The reflecting sheet 34 has a plurality of through-holes 35, which correspond to the plurality of LEDs 33, respectively, and thus the plurality of LEDs 33 protrude through the plurality of through-holes 35 over the reflecting sheet 34, respectively. Optical sheets 38 are disposed over the plurality of LEDs 33, and a transparent window 36 is disposed between the plurality of LEDs 33 and the optical sheets 38. The transparent window 36 includes reflecting dots 37 corresponding to the plurality of LEDs 33, respectively. If there is no transparent window 36 including the reflecting dots 37, dots are shown on images due to strong light directly emitted from the plurality of LEDs 33. The reflecting dots 37 weaken the light directly emitted from the plurality of LEDs 33. Accordingly, light from the plurality of LEDs 33 is provided to the liquid crystal panel 10 after the light is distributed by the reflecting dots 37 and then is properly changed while passing through the optical sheets 38.

In practice, the above-mentioned backlight assemblies have problems. More particularly, while the direct-type backlight assembly including the fluorescent lamps does not require additional elements such as the transparent window or the reflecting dots, the direct-type backlight assembly including the fluorescent lamps is disadvantageous in achieving the high brightness and uniformity as compared with the LED backlight assembly. Furthermore, the direct-type backlight assembly including the fluorescent lamps needs inverter circuits for driving respective fluorescent lamps to thereby cause an increase of manufacturing costs. On the other hand, the LED backlight assembly has relatively high and uniform brightness and good reproducibility in comparison with the direct-type backlight assembly including the fluorescent lamps, and the inverter circuits are not required. However, since the LED backlight assembly has dot light sources, the reflecting dots and the transparent window are needed to distribute light from the dot light sources. This causes an increase in a thickness of the LED backlight assembly.

Trials and researches for a hybrid-type backlight assembly, which includes the fluorescent lamps and the light emitting diodes, have been proposed, and there exists problems due to characteristics and different structures of each light source.

SUMMARY OF THE INVENTION

Accordingly, the present invention is directed to a backlight assembly and a liquid crystal display device including the same that substantially obviates one or more problems due to limitations and disadvantages of the related art.

An advantage of the present invention is to provide a backlight assembly having fluorescent lamps and light emitting diodes as a light source and a liquid crystal display device including the same.

Another advantage of the present invention is to provide a backlight assembly having fluorescent lamps and light emitting diodes as a light source that has a reduced thickness.

Another advantage of the present invention is to provide a backlight assembly having fluorescent lamps and light emitting diodes as a light source that has high and uniform brightness.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, a backlight assembly for a liquid crystal display device includes a plurality of metal core printed circuit boards, a plurality of light emitting diodes arranged on each metal core printed circuit board, a reflecting sheet over the plurality of light emitting diodes, the reflecting sheet including a plurality of first planes, a plurality of second planes, and a plurality of third planes between adjacent first and second planes, the second planes nearer by the metal core printed circuit boards than the first planes, each second plane having a plurality of through-holes corresponding in position to the plurality of light emitting diodes, a plurality of lamps over the reflecting sheet, and optical sheets over the plurality of lamps.

In another aspect of the present invention, a reflecting sheet for a backlight assembly for a liquid crystal display panel includes a plurality of first planes, a plurality of second planes, each second plane disposed between adjacent first planes and having a plurality of through-holes, and a plurality of third planes connecting the second planes with the first planes, wherein, a plurality of lamps are disposed over a first surface of the reflecting sheet, a plurality of light emitting diodes are disposed over a second surface of the reflecting sheet, and the plurality of through-holes corresponds to the plurality of light emitting diodes, respectively.

In another aspect of the present invention, a liquid crystal display device includes a liquid crystal panel, a backlight assembly at a rear side of the liquid crystal panel, a main support enclosing edges of the liquid crystal panel and the backlight assembly, a bottom cover covering a rear side of the backlight assembly and combined with the main support, and a top cover covering edges of a front side of the liquid crystal panel and combined with the main support. Here, the backlight assembly includes a plurality of metal core printed circuit boards, a plurality of light emitting diodes arranged on each metal core printed circuit board, a reflecting sheet over the plurality of light emitting diodes, the reflecting sheet including a plurality of first planes, a plurality of second planes, and a plurality of third planes between adjacent first and second planes, the second planes are closer to the metal core printed circuit boards than the first planes, each second plane having a plurality of through-holes corresponding to the plurality of light emitting diodes, a plurality of lamps over the reflecting sheet, and optical sheets over the plurality of lamps.

In another aspect of the present invention, a backlight assembly for a liquid crystal display device includes a plurality of first light sources at a first distance from an optical sheet, a plurality of second light sources at a second distance from the optical sheet, a reflecting sheet disposed behind the first and second light sources, wherein the first distance and the second distance are substantially different.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, an example of which is illustrated in the accompanying drawings.

Figure 1:
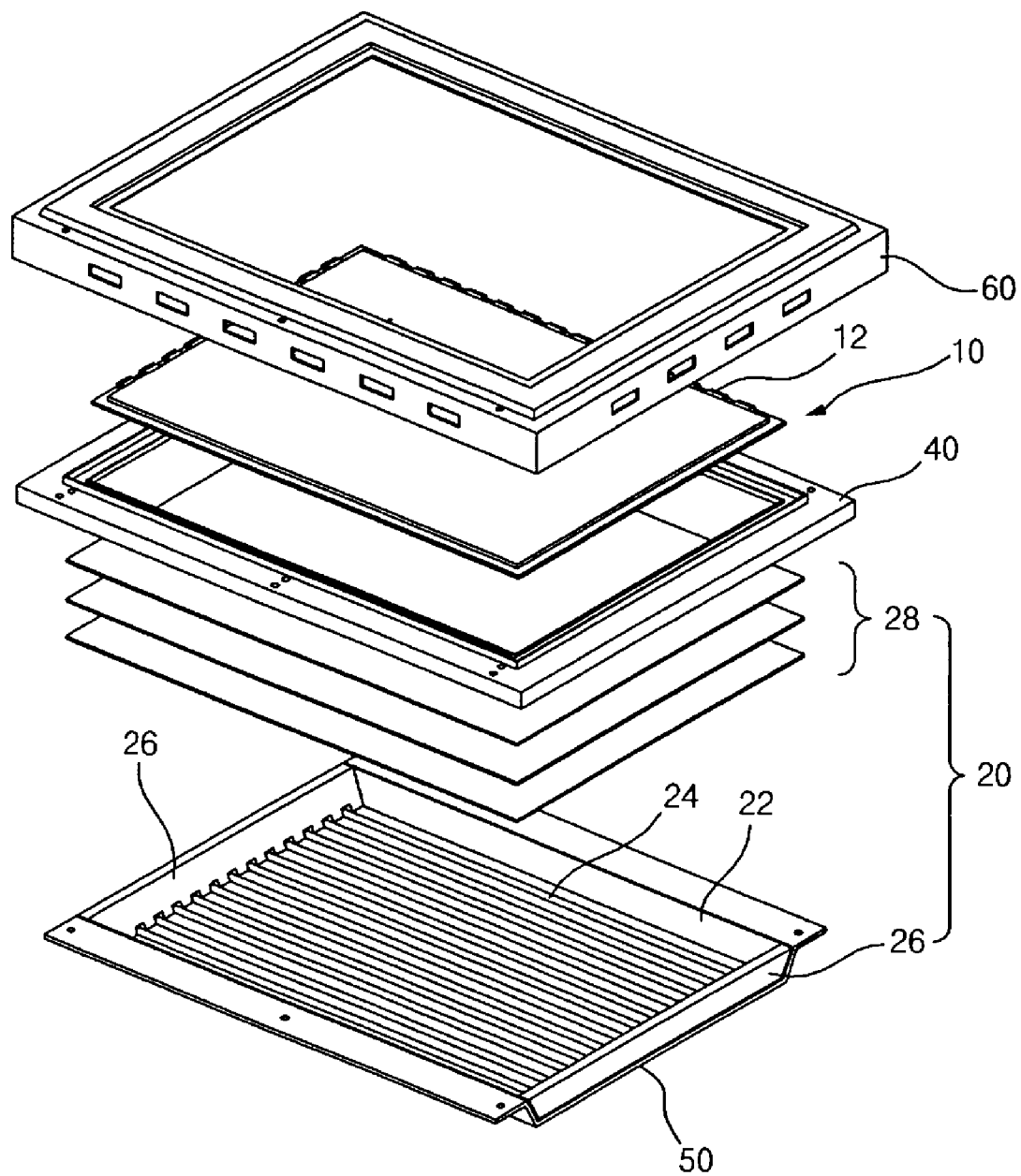
FIG. 1 is a perspective view illustrating a liquid crystal display (LCD) device including a direct-type backlight assembly according to the related art.
Figure 2:
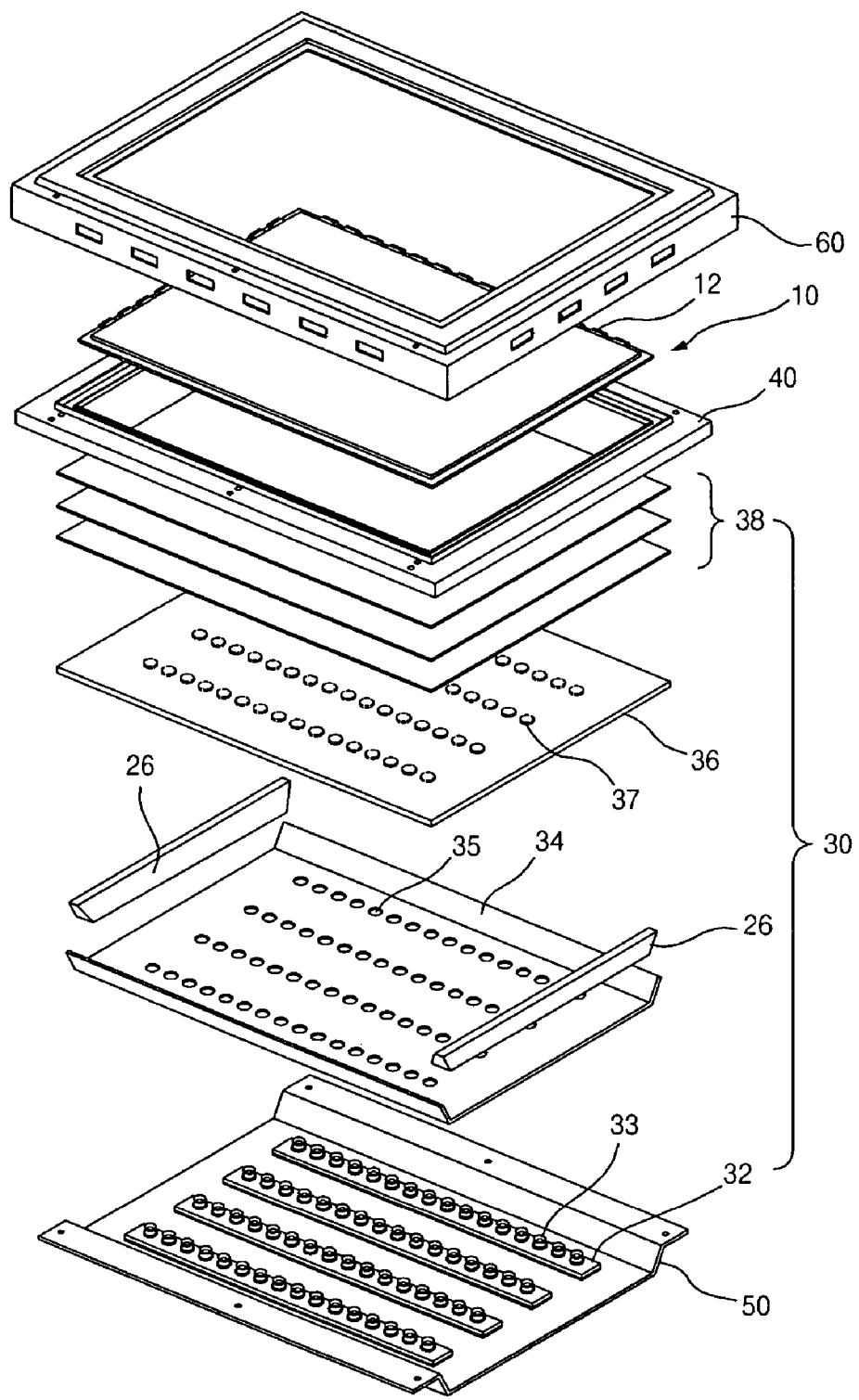
FIG. 2 is a perspective view illustrating an LCD device including a light emitting diode (LED) backlight assembly according to the related art.
Figure 3:
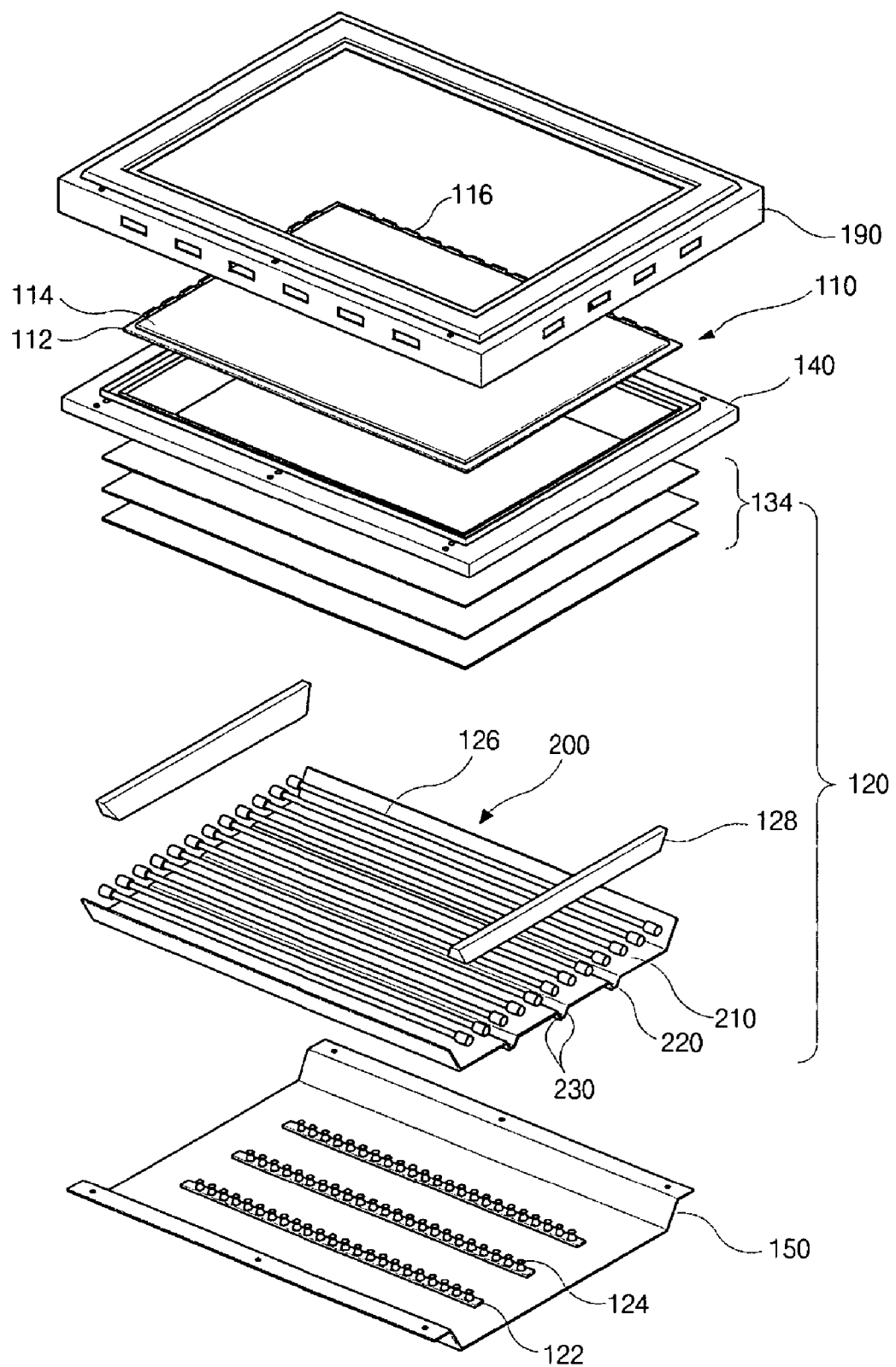
FIG. 3 is a perspective view illustrating an LCD device according to an embodiment of the present invention.

FIG. 3 is a perspective view illustrating a liquid crystal display (LCD) device according to an embodiment of the present invention. In FIG. 3, a backlight assembly 120 is disposed at a rear side of a liquid crystal panel 110, and a main support 140, which is a rectangle frame of a resin mold, edges the backlight assembly 120 and the liquid crystal display panel 110. A bottom cover 150 for preventing a loss of light is combined with the main support 140 at the rear side of the liquid crystal panel 110 to thereby cover the backlight assembly 120. A top cover 190 is connected to the main support 140 and the bottom cover 150 and covers edges of the front side of the liquid crystal panel 110.

The liquid crystal panel 110 produces images. The liquid crystal panel 110 includes first and second substrates attached to each other with a liquid crystal layer interposed therebetween. Although not shown particularly in the figure, a plurality of gate lines and a plurality of data lines are formed on an inner surface of the first substrate facing the second substrate. The plurality of gate lines and the plurality of data lines cross each other to define a plurality of pixel regions. A thin film transistor is formed at each crossing point of the gate and data lines. A transparent pixel electrode is formed in each pixel region and is connected to the thin film transistor. A black matrix and a color filter layer are formed on an inner surface of the second substrate facing the first substrate. The color filter layer includes red, green and blue color filters, and each color filter corresponds to the pixel region. The black matrix is formed between adjacent color filters and covers the gate and data lines and the thin film transistor. A common electrode is formed on the black matrix and the color filter.

The first substrate including the thin film transistor and the pixel electrode may be referred to as an array substrate, and the second substrate including the color filter layer and the common electrode may be referred to as a color filter substrate.

Driving integrated circuits are connected to at least one side of the liquid crystal panel 110 through conductive connecting means 116. This conductive means 116 could be flexible printed circuit (FPC) boards or tape carrier packages (TCPs), for example. The conductive connecting means 116 are bent toward a side of the main support 140 or a rear side of the bottom cover 150. The driving integrated circuits include gate-driving integrated circuits and data-driving integrated circuits. The gate-driving integrated circuits provide scanning signals for turning on/off the thin film transistors through the gate lines. The data-driving integrated circuits provide image signals for each frame through the data lines. The gate-driving integrated circuits and the data-driving integrated circuits may be disposed at adjacent sides of the liquid crystal panel 110, respectively.

In the liquid crystal panel 110, the gate lines are scanned line by line by the scanning signals, and when the thin film transistors connected to a selected gate line are turned on by the scanning signal provided through the selected gate line, the image signals are provided to the pixel electrodes through the data lines and the thin film transistors. Therefore, the arrangement of liquid crystal molecules is changed according to variations of an electric field induced between the pixel electrode and the common electrode.

The backlight assembly 120 provides light to the liquid crystal panel 110. The backlight assembly 120 includes a plurality of metal core printed circuit boards (MCPCBs) 122, a plurality of light emitting diodes (LEDs) 124, a reflecting sheet 200, a plurality of fluorescent lamps 126, a couple of side supports 128, and a plurality of optical sheets 134.

The plurality of MCPCBs 122 have a stripe shape and are arranged on an inner surface of the bottom cover 150. The plurality of LEDs 124 are set up on each of the plurality of MCPCBs 122 in a line. Each of the plurality of LEDs 124 include one of red, green and blue LEDs, and the red, green and blue LEDs 124 are sequentially arranged on each MCPCB 122, whereby red, green and blue lights are mixed to produce a white light. The reflecting sheet 200 is disposed on the bottom cover 150. The reflecting sheet 200 covers the plurality of MCPCBs 122 and has a plurality of through-holes (not shown), which correspond to the plurality of LEDs 124, respectively. Thus, the plurality of LEDs 124 protrude through the plurality of through-holes, respectively.

The plurality of fluorescent lamps 126 are disposed side by side on the reflecting sheet 200. The plurality of fluorescent lamps 126 are parallel to the plurality of MCPCBs 122. The plurality of fluorescent lamps 126 may be cold cathode fluorescent lamps. The side supports 128 are settled on the bottom cover 150 across both ends of the plurality of fluorescent lamps 126 to thereby fix the plurality of fluorescent lamps 126. The optical sheets 134 are disposed over the plurality of fluorescent lamps 126.

The backlight assembly of the present invention is a hybrid-type, in which LEDs and fluorescent lamps are used as the light source.

Accordingly, light, which is directly emitted from the plurality of LEDs 124 and the plurality of fluorescent lamps 126 or reflected on the reflecting sheet 200 after emitted from the plurality of LEDs 124 and the plurality of fluorescent lamps 126, is properly changed while passing through the optical sheets 134 and then is provided to the liquid crystal panel 110.

Meanwhile, as stated above, the bottom cover 150 is disposed at the rear side of the liquid crystal panel 110 and provides packaging spaces for the backlight assembly 120. The bottom cover 150 covers a rear side of the backlight assembly 120 and is combined with the main support 140. The top cover 190 is connected to the main support 140, covering edges of the front side of the liquid crystal panel 110.

Hereinafter, the reflecting sheet of the present invention will be explained in detail with reference to attached drawings.

Figure 4:
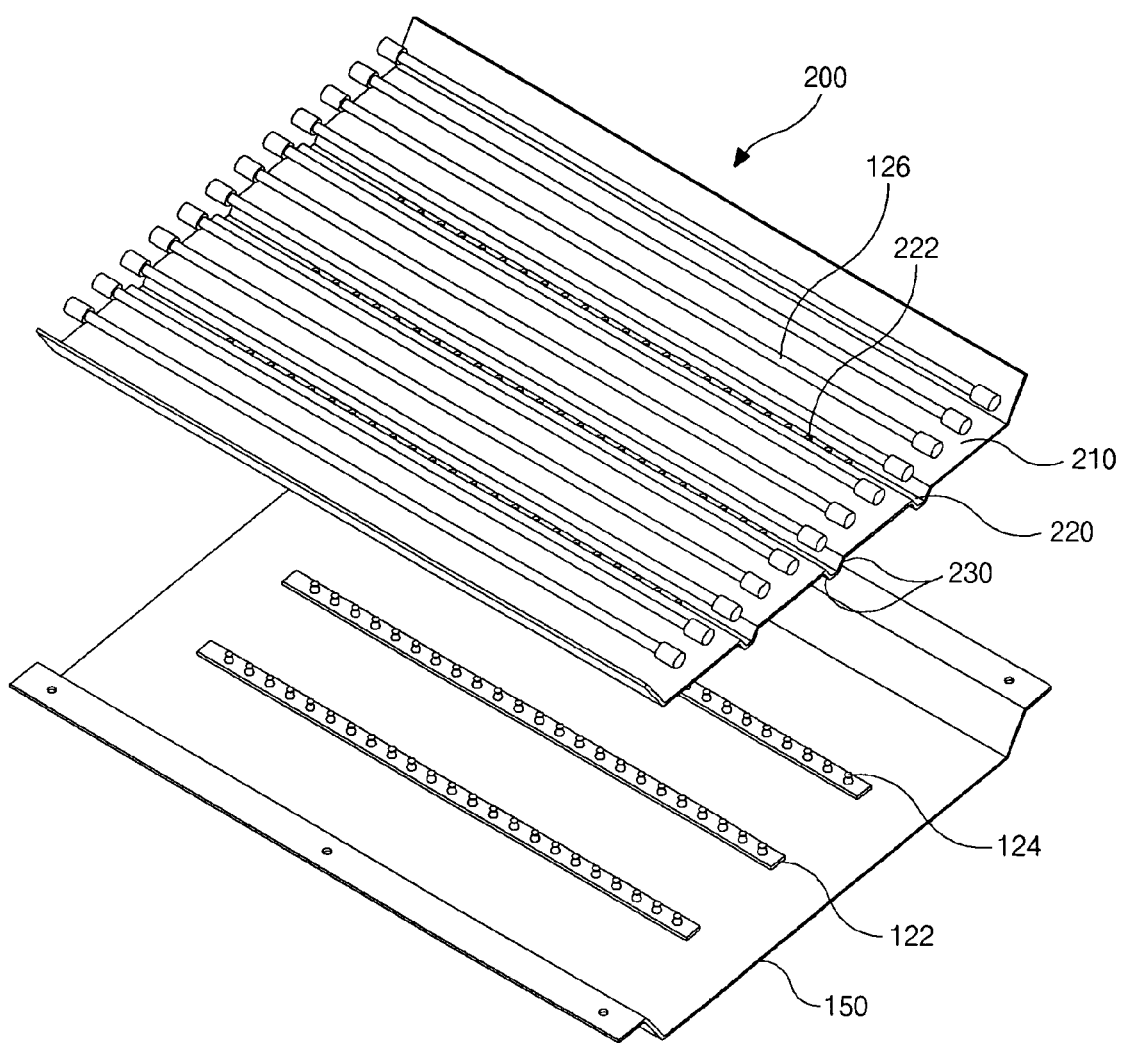
FIG. 4 is a perspective view enlarging a backlight assembly according to an embodiment of the present invention.
Figure 5:
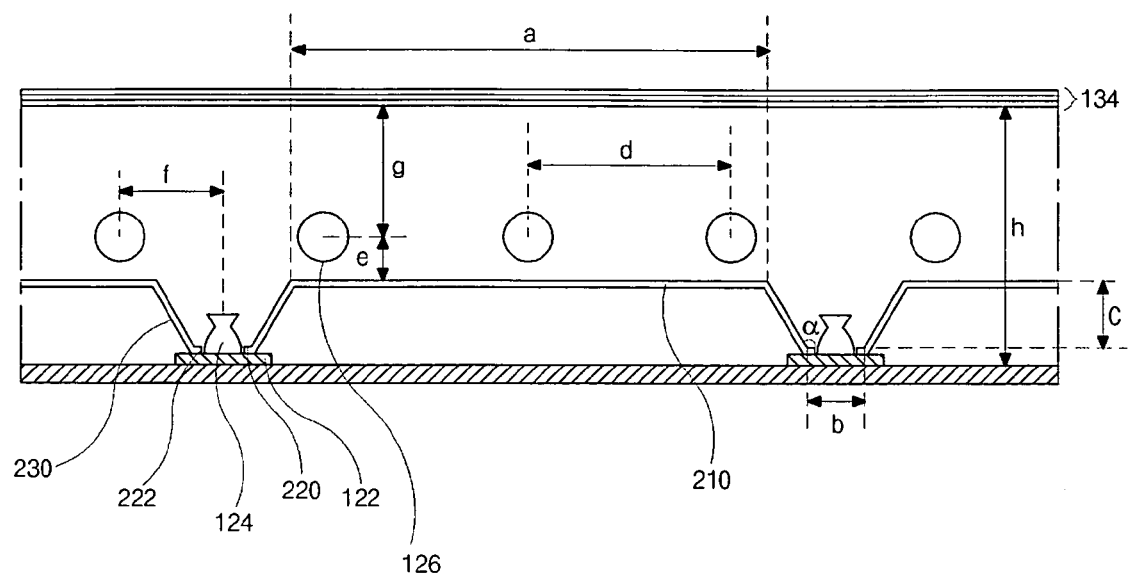
FIG. 5 is a cross-sectional view illustrating a backlight assembly according to the embodiment of the present invention.

FIG. 4 is a perspective view enlarging a backlight assembly according to an embodiment of the present invention. FIG. 5 is a cross-sectional view illustrating a backlight assembly according to the embodiment of the present invention.

In FIGS. 4 and 5, the reflecting sheet 200 has a lower side, which includes (n+1) first planes 210, n second planes 220, and 2n inclined planes 230, wherein n is a natural number. The plurality of fluorescent lamps 126 are disposed over the first planes 210. Each of the second planes 220 are disposed between adjacent first planes 210, and the inclined planes 230 connect the second planes 220 with the first planes 210. The second planes 220 are nearer by the bottom cover 150 than the first planes 210 to thereby form recessed portions. Each of the second planes 220 includes the plurality of through-holes 222 arranged in a line. As stated above, the plurality of through-holes 222 correspond to the plurality of LEDs 124, and thus the plurality of LEDs 125 protrude through the plurality of through-holes 222, respectively. The second planes 220 are parallel to the plurality of fluorescent lamps 126, and beneficially, each of the second planes 220 is disposed between adjacent fluorescent lamps 126.

The shape of the reflecting sheet 200 illustrated in FIGS. 4 and 5 is by way of example only. It is understood that the present invention encompasses reflecting sheets having any shape or contour, including a contour in the region corresponding to the lamps and another contour in the region corresponding to the LEDs.

In the present invention, by forming the recessed portions in the reflecting sheet 200 corresponding the plurality of LEDs 124, the plurality of LEDs 124 are farther from the liquid crystal panel 110 as compared to the related art. Accordingly, influences from light directly from the plurality of LEDs 124 are decreased, and a transparent window including reflecting dots can be omitted. In addition, a uniform and high brightness is achieved due to light from the plurality of LEDs 124 and the plurality of fluorescent lamps 126.

Here, each of the first planes 210 has a first width "a" in a range of about 170 mm to about 105 mm. Each of the second planes 220 has a second width "b" in a range of about 10 mm to about 20 mm. A first distance "c" between the first and second planes 210 and 220 may be about 5 mm to about 10 mm, and desirably, may be about 8.5 mm. An angle "α" made between the second plane 220 and the inclined plane 230 may be about 120 degrees to 155 degrees, and beneficially, may be about 129.5 degrees.

A second distance "d" between adjacent fluorescent lamps 126 may be about 10 mm to about 40 mm. Beneficially, the distance "d" may be about 35 mm. A third distance "e" between the fluorescent lamp 126 and the first plane 210 may be about 3 mm to about 7 mm, beneficially, about 5 mm. A fourth distance "f" between the fluorescent lamp 126 and the LED 124 along a horizontal direction parallel to the bottom cover 150 may be about 15 mm to about 20 mm, desirably, about 17.5 mm. A fifth distance "g" between the fluorescent lamp 126 and a bottom surface of the optical sheets 134 may be about 10 mm to about 27 mm, beneficially, about 22.5 mm. A sixth distance "h" between the bottom cover 150 and the bottom surface of the optical sheets 134 may be about 20 mm to about 40 mm, desirably, about 36 mm.

In addition, when the second planes 220 of the reflecting sheet 200 directly contact the MCPCBs 122, respectively, a distance between adjacent MCPCBs 122 may be about 125 mm to about 135 mm. The distance between adjacent MCPCBs 122 may be changed.

The above values are obtained from results of repeated experiments and act as critical ranges. Here, when a ratio "g/d" of the fifth distance "g" and the second distance "d" is about 0.6 to about 0.7, the most uniform and highest brightness can be realized.

In the backlight assembly including fluorescent lamp and LEDs according to the present invention, by using a reflecting sheet having recessed portions, a uniform and high brightness can be obtained without a transparent window having reflecting dots. Therefore, the backlight assembly has a reduced thickness. Additionally, the number of the fluorescent lamps is decreased due to the LEDs, and thus the number of inverter circuits is also decreased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A reflecting sheet for a backlight assembly for a liquid crystal display panel, comprising:
  a plurality of first planes;
  a plurality of second planes, each second plane disposed between adjacent first planes and having a plurality of through-holes; and
  a plurality of third planes connecting the second planes with the first planes,
  wherein, a plurality of lamps are disposed over a first surface of the reflecting sheet, a plurality of light emitting diodes including red, green and blue light emitting diodes are disposed over a second surface of the reflecting sheet such that red, green and blue lights are mixed to produce a white light, and the plurality of through-holes corresponds to the plurality of light emitting diodes, respectively,
  wherein the lamps are directly over the first planes, and the third planes are parallel to the lamps.

2. The reflecting sheet according to claim 1, wherein the second planes are farther from the liquid crystal display panel than the first planes.

3. The reflecting sheet according to claim 1, wherein a distance between adjacent iamps is between about 10 mm to about 40 mm.

4. The reflecting sheet according to claim 1, wherein an angle made between the second plane and the third plane is about 120 degrees to about 155 degrees.

5. The reflecting sheet according to claim 1, wherein the plurality of through-holes are arranged in a line along a direction parallel to the plurality of lamps.

6. The reflecting sheet of claim 1, wherein a distance between the lamp and the first plane is between about 3 mm to about 7 mm and a distance between the first and second planes is between about 5 mm to about 10 mm.

7. The reflecting sheet according to claim 1, wherein the first planes have a width in a range of about 70 mm to about 105 mm, and the second planes have a width in a range of about 10 mm to about 20 mm.

8. The reflecting sheet according to claim 7, wherein a distance between the lamp and the light emitting diode along a direction parallel to the first and second planes is about 15 mm to about 20 mm.

9. A backlight assembly for a liquid crystal display device, comprising:
  a plurality of metal core printed circuit boards;
  a plurality of light emitting diodes arranged on each metal core printed circuit board, the plurality of light emitting diodes including red, green and blue light emitting diodes such that red, green and blue lights are mixed to produce a white light;
  a reflecting sheet over the plurality of light emitting diodes, the reflecting sheet including a plurality of first planes, a plurality of second planes, and a plurality of third planes between adjacent first and second planes, the second planes nearer by the metal core printed circuit boards than the first planes, each second plane having a plurality of through-holes corresponding in position to the plurality of light emitting diodes;
  a plurality of lamps directly over the first planes of the reflecting sheet; and
  optical sheets over the plurality of lamps,
  wherein the third planes are parallel to the lamps.

10. The backlight assembly of claim 9, wherein the first, second, and third planes are planar surfaces.

11. The backlight assembly according to claim 9, wherein the plurality of light emitting diodes protrude through the plurality of through-holes, respectively.

12. The backlight assembly according to claim 9, wherein the metal core printed circuit boards are parallel to the plurality of lamps.

13. The backlight assembly according to claim 9, wherein each of the metal core printed circuit boards is disposed between adjacent lamps.

14. The backlight assembly according to claim 9, wherein the second planes directly contact the metal core printed circuit boards, respectively.

15. The backlight assembly according to claim 9, wherein the ratio of a first distance between the optical sheets and the plurality of lamps to a second distance between adjacent lamps is between about 0.6 to about 0.7.

16. The backlight assembly according to claim 9, wherein a distance between adjacent metal core printed circuit boards is between about 125 mm to about 135 mm.

17. The backlight assembly of claim 9, wherein a distance between a bottom cover under the plurality of metal core printed circuit boards and the optical sheets is about 20 mm to about 40 mm and a distance between the optical sheets and the plurality of lamps is about 10 mm to about 27 mm.

18. A liquid crystal display device, comprising:
a liquid crystal panel;
a backlight assembly at a rear side of the liquid crystal panel, the backlight assembly including:
    a plurality of metal core printed circuit boards;
    a plurality of light emitting diodes arranged on each metal core printed circuit board, the plurality of light emitting diodes including red, green and blue light emitting diodes such that red, green and blue lights are mixed to produce a white light;
    a reflecting sheet over the plurality of light emitting diodes, the reflecting sheet including a plurality of first planes, a plurality of second planes, and a plurality of third planes between adjacent first and second planes, the second planes are closer to the metal core printed circuit boards than the first planes, each second plane having a plurality of through-holes corresponding to the plurality of light emitting diodes;
    a plurality of lamps directly over the first planes of the reflecting sheet; and
    optical sheets over the plurality of lamps;
a main support enclosing edges of the liquid crystal panel and the backlight assembly;
a bottom cover covering a rear side of the backlight assembly and combined with the main support; and
a top cover covering edges of a front side of the liquid crystal panel and combined with the main supports,
wherein the third planes are parallel to the lamps.

19. The device according to claim 18, wherein a ratio of a first distance between the optical sheets and the plurality of lamps to a second distance between adjacent lamps is about 0.6 to about 0.7.

20. The reflecting sheet of claim 18, wherein a distance between the bottom cover and the optical sheets is about 20 mm to about 40 mm and a distance between the optical sheets and the plurality of lamps is about 10 mm to about 27 mm.

* * * * *